United States Patent
Brogan et al.

(10) Patent No.: US 11,735,927 B2
(45) Date of Patent: Aug. 22, 2023

(54) SYSTEM AND METHOD FOR SUPPLYING ELECTRIC POWER TO A GRID AND FOR SUPPORTING THE GRID

(71) Applicant: Siemens Gamesa Renewable Energy A/S, Brande (DK)

(72) Inventors: Paul Brian Brogan, Glasgow (GB); Douglas Elliott, Glasgow (GB); Thyge Knueppel, Værløse (DK); Philip Perry Waite, Newcastle (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 17 days.

(21) Appl. No.: 17/601,992

(22) PCT Filed: Mar. 31, 2020

(86) PCT No.: PCT/EP2020/059026
§ 371 (c)(1),
(2) Date: Oct. 7, 2021

(87) PCT Pub. No.: WO2020/216581
PCT Pub. Date: Oct. 29, 2020

(65) Prior Publication Data
US 2022/0216696 A1   Jul. 7, 2022

(30) Foreign Application Priority Data
Apr. 23, 2019   (EP) .................................... 19170521

(51) Int. Cl.
*H02J 3/38*   (2006.01)
*H02J 3/32*   (2006.01)
(Continued)

(52) U.S. Cl.
CPC ................ *H02J 3/381* (2013.01); *H02J 3/32* (2013.01); *H02J 3/36* (2013.01); *H02J 3/40* (2013.01); *H02J 3/46* (2013.01); *H02J 2300/28* (2020.01)

(58) Field of Classification Search
CPC ...... H02J 3/38; H02J 3/381; H02J 3/32; H02J 3/36; H02J 2300/28
See application file for complete search history.

(56) References Cited

U.S. PATENT DOCUMENTS

| 2015/0381089 A1 | 12/2015 | Tarnowski et al. |
| 2018/0090936 A1 | 3/2018 | Guo et al. |
| 2019/0089279 A1 | 3/2019 | Gu et al. |

FOREIGN PATENT DOCUMENTS

WO   2014121794 A1   8/2014

OTHER PUBLICATIONS

Beck H-P et al: "Virtual synchronous machine", Electrical Power Quality and Utilisation, 2007. EPQU 2007. 9th International Conference On, IEEE, Piscataway, NJ, USA, pp. 1-6, XP031226044, ISBN: 978-84-690-9441-9; col. 1, paragraph 1—col. 3, paragraph 3; 2007.

(Continued)

*Primary Examiner* — Robert L Deberadinis
(74) *Attorney, Agent, or Firm* — Schmeiser, Olsen & Watts LLP

(57) ABSTRACT

A system for supplying electric power to a grid and for supporting the grid is provided. The system includes (a) a power generator including a main converter, (b) an energy buffer including an energy storage and a secondary converter, (c) a grid stability monitor-configured to provide a grid stability, and (d) a controller configured to control the main converter and the secondary converter in dependency on the grid stability indication such that when the stability level is at least equal to a predetermined threshold value, the (Continued)

main converter is controlled to operate as a virtual synchronous machine and the secondary converter is controlled to operate to maintain a predetermined amount of energy in the energy storage, and when the stability level is below the predetermined threshold value, the secondary converter is operated to provide a predetermined response in order to support the grid stability.

13 Claims, 1 Drawing Sheet

(51) Int. Cl.
*H02J 3/36* (2006.01)
*H02J 3/40* (2006.01)
*H02J 3/46* (2006.01)

(56) References Cited

OTHER PUBLICATIONS

European Search Report dated Jun. 18, 2019 for application No. 19170521.9.
International Search Report and Written Opinion of the International Searching Authority dated Jun. 2, 2020 for application No. PCT/EP2020/059026.
International Preliminary Report on Patentability dated Sep. 28, 2021 for application No. PCT/EP2020/059026.

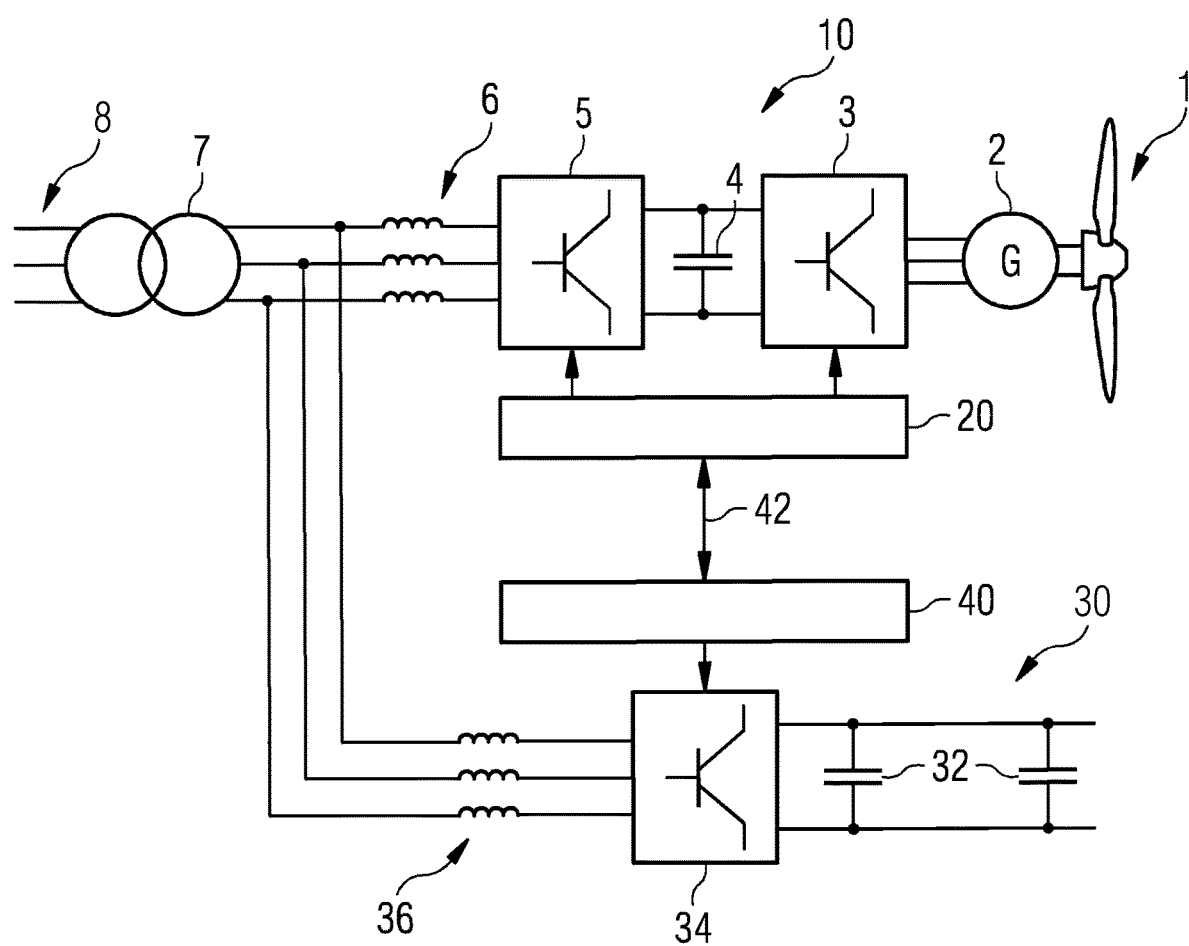

SYSTEM AND METHOD FOR SUPPLYING ELECTRIC POWER TO A GRID AND FOR SUPPORTING THE GRID

CROSS-REFERENCE TO RELATED APPLICATIONS

This application claims priority to PCT Application No. PCT/EP2020/059026, having a filing date of Mar. 31, 2020, which is based off of EP Application No. 19170521.9, having a filing date of Apr. 23, 2019, the entire contents both of which are hereby incorporated by reference.

FIELD OF TECHNOLOGY

The following relates to the field of grid-connected Power Electronic Converters used in electric power generation or consumption, in particular systems and methods for supplying or consuming electric power to a transmission or distribution grid that supports the frequency and voltage stability of the distribution grid.

BACKGROUND

With the increasing fraction of wind turbine generators and other renewable energy sources using grid-connected Power Electronic Converters among the electric power producing plants, modern generators, such as wind turbine generators, may at least to some extent be operated to emulate the inherent characteristics provided by synchronous machines in order to assist in stabilizing the power grid, in particular the grid frequency and voltage.

However, in case of severe frequency disturbances, as would occur in the sudden loss of a major generator or other faults, even this way of operating the wind turbine generators may not suffice to provide the required grid-stabilizing response, at least not without additional hardware which comes with a significant increase in cost and power losses.

There may thus be a need for renewable energy-based systems for supplying electric power to a power grid, which are capable of also supporting the impact on the grid of severe faults and disturbances without extensive costs and/or power losses.

SUMMARY

According to a first aspect of embodiments of the invention there is provided a system for supplying electric power to a grid (transmission grid or distribution grid) and for supporting the grid. The described system comprises (a) a power generator (or load) comprising a main converter coupled to the grid, (b) an energy buffer comprising an energy storage and a secondary converter coupled to the grid in parallel with the main converter, (c) a grid stability monitor configured to provide a grid stability indication representative of a stability level of the grid, and (d) a controller configured to control the main converter and the secondary converter in dependency on the grid stability indication such that (d1) when the stability level is at least equal to a predetermined threshold value, the main converter is controlled to operate as a virtual synchronous machine (of defined Inertia H) and the secondary converter is controlled to operate to maintain a predetermined amount of energy in the energy storage, and (d2) when the stability level is below the predetermined threshold value, the secondary converter is operated (as a virtual synchronous machine of Inertia H) to provide a predetermined response in order to support the grid stability. In this context, the term Virtual Synchronous Machine VSM may be used to describe that the control action of the converter, to some extent, emulates the stabilizing characteristic of a grid-connected synchronous machine with shaft-connected inertia, regarding its electrical response to changes of grid voltage amplitude, phase, and frequency.

This aspect of embodiments of the invention is based on the idea that an energy buffer with its own (secondary) converter is operated in parallel with the power generator which has its main converter coupled to the power grid. This is done in such a way that the secondary converter is only active when the energy buffer is needed to provide an adequate response to a grid stability problem or when charging of the energy buffer is needed. Thereby, power losses are kept at a minimum while the ability to provide adequate response to significant disturbances is significantly improved.

The grid stability indication may be a Boolean value indicating that the energy buffer is either needed or not. Alternatively, any other form of control function that is capable of dynamically varying the distribution of provision of stabilizing function between the main converter and secondary converter in response to the monitored stability level of the grid. This also includes the possibility of a smooth handover from the main converter to the energy buffer, i.e. where the response is gradually taken over by the energy buffer during a certain period of time.

According to an embodiment of the invention, when the secondary converter is not operating to provide the grid stabilizing function, the controller is configured to operate the secondary converter to maintain the predetermined amount of energy in the energy storage by operating the secondary converter to supply energy to the energy storage when the amount of energy in the energy storage drops below a predetermined minimum energy level and until the amount of energy in the energy storage reaches a predetermined maximum energy level.

In other words, charging or filling up of the energy storage is initiated once the amount of energy in the energy storage drops below the predetermined minimum energy level and continues until the predetermined maximum energy level is reached. The latter may in particular correspond to the total storage capacity of the energy storage, while the minimum energy level may in particular be equal to 90% or 95% of the total storage capacity.

A drop below the minimum energy level may in particular occur due to losses from the energy storage.

Alternatively, a separate so-called trickle charger may be used to maintain the desired energy level.

According to a further embodiment of the invention, the energy storage comprises a capacitor.

The capacitor may comprise a plurality of capacitor units arranged in parallel.

According to a further embodiment of the invention, the energy storage comprises a bank of supercapacitors or ultra-capacitors.

The total capacity of the energy storage may be chosen such that the energy buffer is capable of delivering between 10% and 30% of the rated power of the power generator for a period up to 10 seconds.

According to a further embodiment of the invention, the grid stability monitor is configured to monitor one or more of (a) a deviation of the grid frequency from a nominal grid frequency, (b) a grid frequency gradient, (c) a deviation of the grid voltage from a nominal grid voltage, (d) a grid voltage gradient, (e) a DC link voltage, and (f) a main converter current.

These parameters may be taken into account independently or in combination when determining the grid stability indication. Furthermore, the grid stability monitor may compare the various parameter values with one or more thresholds and count a period of time during which a particular threshold is exceeded.

For example, the grid stability monitor may output a grid stability indication that activates the energy buffer to take over provision of the virtual synchronous machine function of the main converter if the grid frequency drops more than 0.1 Hz below the prevailing grid frequency within 10 ms.

According to a further embodiment of the invention, the predetermined threshold value comprises one or more of (a) a predetermined deviation of the grid frequency from the nominal grid frequency, (b) a predetermined grid frequency gradient, (c) a predetermined deviation of the grid voltage from the nominal grid voltage, (d) a predetermined grid voltage gradient, (e) a predetermined DC link voltage value, and (f) a predetermined main converter current value.

According to a further embodiment of the invention, when the level of stability is below the predetermined threshold value, the main converter is controlled to supply electric power to the grid without supporting the grid stability.

In other words, the main converter is not operated as a virtual synchronous machine during the response to a grid instability. Thus, the power generator does not try to support the grid during this period but completely hands over this task to the energy buffer.

According to a further embodiment of the invention, the power generator comprises a wind turbine generator and the main converter comprises a rectifier, a DC link and an inverter.

The rectifier converts the AC output from the wind turbine generator. The corresponding DC voltage is supplied to the inverter via the DC link. The inverter converts the received DC voltage to a desired AC output, e.g., utilizing pulse width modulation (PWM).

It is explicitly noted that the main converter can in principle be any topology of power converter, with any type of switching method, that allows control of power (and optionally reactive power) to the grid (or another connected entity). Furthermore, the main converter can be connected to any form of power generation, load or storage system.

According to a further embodiment of the invention, the secondary converter comprises an inverter with semiconductor switches.

The inverter of the secondary converter may utilize PWM to generate the desired AC output (active and/or reactive power). When supplying energy to the energy storage, the semiconductor switches will be operated to allow current to flow towards the energy storage.

Again, the secondary converter can in principle be any topology of power converter, with any type of switching method, that allows control of power (and reactive power) to the grid (or another connected entity). Furthermore, the secondary converter can be connected to any form of power generation, load or storage system (that permits rapid change of power).

According to a further embodiment of the invention, the controller comprises a main controller for controlling the main converter and a secondary controller for controlling the secondary converter.

The main controller and the secondary controller may be implemented as separate hardware units or as functional units running on the same hardware with coordination between the two. Furthermore, the controllers may be implemented using a single integrated "Multiple input, Multiple output" (MIMO) control algorithm using inputs/outputs from/to main and auxiliary converters.

According to a second aspect of embodiments of the invention, there is provided a wind farm comprising a plurality of systems, wherein the power generator of each system is a wind turbine generator.

This aspect of embodiments of the invention utilizes the idea according to the first aspect on each wind turbine in a wind farm.

According to a further embodiment of the invention, the energy buffers of all systems are formed as a single integrated wind farm energy buffer.

In other words, instead of each wind turbine generator having its own energy buffer, the wind park has a central energy storage. In case of an off-shore wind farm, the energy buffer may be located on-shore, e.g., at the grid connection point.

According to a third aspect of embodiments of the invention, there is provided a method of supplying electric power to a grid and for supporting the grid. The described method comprises (a) providing a power generator comprising a main converter coupled to the grid, (b) providing an energy buffer comprising an energy storage and a secondary converter coupled to the grid in parallel with the main converter, (c) operating a grid stability monitor to provide a grid stability indication representative of a stability level of the grid, and (d) operating a controller to control the main converter and the secondary converter in dependency on the grid stability indication such that (d1) when the stability level is at least equal to a predetermined threshold value, the main converter is controlled to operate as a virtual synchronous machine and the secondary converter is controlled to operate to maintain a predetermined amount of energy in the energy storage, and (d2) when the stability level is below the predetermined threshold value, the secondary converter is operated to provide a predetermined response in order to support the grid stability.

This aspect of embodiments of the invention is essentially based on the same idea as the first aspect described above.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Some of the embodiments will be described in detail, with reference to the following FIGURES, wherein like designations denote like members, wherein:

FIG. 1 shows a system according to an embodiment of the present invention.

DETAILED DESCRIPTION

The illustration in the drawing is schematic. It is noted that in different FIGURES, similar or identical elements are provided with the same reference numerals or with reference numerals which differ only within the first digit.

FIG. 1 shows a system for supplying electric power to a grid and for supporting the grid in accordance with an embodiment of the invention. More specifically, the system comprises a wind turbine power generator comprising wind rotor 1, generator 2 and a main converter 10 coupled to the grid 8 via inductances 6 and transformer 7. The main converter 10 comprises a rectifier 3, a DC link 4 and an inverter 5. The main converter 10 is connected to a main controller 20 which provides control signals to semiconductor switches in the rectifier 3 and the inverter 5, respectively.

The system further comprises an energy buffer comprising an energy storage 30 and a secondary converter 34 coupled to the grid 8 in parallel with the main converter 10 via inductances 36 and the transformer 7. The energy storage 30 comprises a plurality of capacitors 32, in particular supercapacitors, coupled in parallel to form a capacitor bank. The secondary converter 34 is coupled to a secondary controller 40 which provides control signals to semiconductor switches in the secondary converter 34. The main controller 20 and the secondary controller 40 are interconnected by cable 42, thereby forming a controller for the entire system. Although the controllers 20 and 40 are shown as separate interconnected units, they may just as well be formed as individual functional blocks within an integrated controller.

The system further comprises a grid stability monitor (not shown) configured to provide a grid stability indication representative of a stability level of the grid 8. The grid stability monitor may be a separate unit or integrated in one of the controllers 20, 40. The controllers 20,40 are configured to control the main converter 10 and the secondary converter 34 in dependency on the grid stability indication such that when the stability level is at least equal to a predetermined threshold value, the main converter 10 is controlled to operate as a virtual synchronous machine and the secondary converter 34 is controlled to operate to maintain a predetermined amount of energy in the energy storage 30. On the other hand, when the stability level is below the predetermined threshold value, the secondary converter 34 is operated to provide a predetermined response (active and/or reactive power) in order to support the grid stability. During this response period, the main controller 20 may change the control of the main converter 10 to temporarily cease acting as a virtual synchronous machine and just producing the currently required (active and reactive) power output.

As described above, the secondary converter 40 remains inactive during normal operation (where no additional grid support is needed beyond that provided by the main converter 20 acting as a virtual synchronous machine) except when the voltage across the bank of capacitor 32 drops to a predetermined minimum level, such as 90% of the voltage corresponding to the fully charged state. When this happens, the semiconductor switches of the secondary converter 34 are closed such that a charging current is branched off from the output current from the main converter 10 and supplied to the capacitors 32 until these are fully charged. Thereby, electrical losses are significantly reduced in comparison to a situation where the secondary converter 34 would be switching continuously also during normal (undisturbed) operation.

The grid stability monitor is in particular configured to monitor one or more of
a deviation of the grid frequency from a nominal grid frequency,
a grid frequency gradient,
a deviation of the grid voltage from a nominal grid voltage,
a grid voltage gradient,
a DC link voltage, and
a main converter current.

Furthermore, the predetermined threshold value may comprise one or more of
a predetermined deviation of the grid frequency from the nominal grid frequency,
a predetermined grid frequency gradient,
a predetermined deviation of the grid voltage from the nominal grid voltage,
a predetermined grid voltage gradient,
a predetermined DC link voltage value, and
a predetermined main converter current value.

The combination of the wind turbine main converter 10 and parallel energy buffer, where both are using a virtual synchronous machine (VSM) type controller, is expected to supply power and energy to the power system 8 in response to variations of frequency, and or phase, about its nominal value. Small variations of the power system frequency occur very frequently due to the variance between the generated power and the power consumed by the different loads and require only small changes to the power/energy output of the combined wind turbine and energy buffer. The small nature of these continual frequency changes (typically <+/−0.2 Hz over extended times) are such that the wind turbine converter 10 can respond to them without any action by the energy buffer, as the required dynamic energy exchange between the AC system and the power converter 10 is very small.

However, occasionally (for example twice per month) the power system frequency deviates from its normal operating point by a much larger amount; requiring the combined wind turbine and energy buffer to provide a much larger change of power/energy in response. In this case the main wind turbine converter alone is not capable of providing the required dynamic energy response (due to its limited energy storage) and therefore the energy buffer must assist.

A second requirement on the energy buffer is to assist the wind turbine main converter 10 in responding to grid faults; where the voltage at the terminals of the wind turbine falls towards zero. In this situation the combination of the energy buffer and the wind turbine main converter 10 are required to feed a minimum amount of fault current into the grid (potentially 150% of the main converter rated current in future); the magnitude of which, in particularly severe fault situations, is large enough that the energy buffer must output is maximum current to assist the main converter 10. In less severe fault situations, the main converter 10 will be capable of providing the required fault current without extra assistance.

The ability of the wind turbine to respond to the continual small power system frequency variations and less severe grid fault events will mean that the parallel energy buffer will spend the majority of the time exchanging very little energy with the power system. While not exchanging energy with the grid, continual switching of the power electronic devices would consume energy and dissipate it as heat loss, lowering the efficiency of the energy buffer and associated wind turbine. The only energy exchanged by the energy buffer with the power system during normal operation would be energy required to cover the losses of its converter 34.

This problem is overcome by embodiments of the present invention which reduces the energy losses associated with the continual switching of the energy buffer's power electronic devices and therefore limits the change in the overall wind turbine power train efficiency when the energy buffer is introduced.

For the energy buffer to provide assistance during large grid frequency and low voltage fault events, its converter 34 must be charged and its control 40 active. However, since it does not need to continuously exchange power/energy or fault current with the power system its power electronic devices can be held in the off state until the controller detects a variation of the grid frequency or a low voltage fault event significant enough to require the assistance of the energy buffer. At which point the devices are allowed to switch as necessary to provide the power/energy to provide the required response.

Holding the switches in the off position when the buffer is not required will mean that the loss of energy that occurs when each device is switched will not be experienced and therefore the continual energy loss of the energy buffer will be minimized, and the efficiency improved.

The activation of the energy buffer switching will be coordinated with the controller of the wind turbine network bridge converter 10 so that the wind turbine effectively 'hands over' its response to large power system frequency or low voltage fault events to the energy buffer, so that it can respect its power, energy and current limits. Once the required response to the power system frequency or low voltage fault event has been completed by the energy buffer, it will return itself to its pre-event state of charge over a period of time and then return its power electronic devices to the off state.

While not continuously switching its devices the energy buffer must maintain its charged state, which will decay over time due to charge leakage from the capacitors 32.

Therefore, the energy buffer must also engage the switching of its power electronic devices intermittently to allow the import of the necessary energy to maintain adequate charge in its capacitors 32. This process will be activated and deactivated using a hysteresis band around the converter DC link voltage; the converter will switch its devices to charge the capacitors 32 to a maximum level and then cease to switch until the voltage falls to a lower level. The time between charge cycles will be of the order of several tens of seconds/minutes and charge time will be relatively short, so this process will not have a significant impact on the efficiency of the converter 34.

An advantage of embodiments of the present invention is the activation, by coordinated control of the main converter 10 and the energy buffer, of the energy buffer power electronic device 34 switching only when it is required for either responding to a large power system frequency variation, a low voltage fault event or for maintaining the charged state of the capacitors 32.

Therefore, preventing the continual loss of energy that occurs when each device is switched when there is no requirement for the energy buffer to exchange power/energy with the grid. The inactivity of the switches will significantly reduce the operational energy losses of the energy buffer and therefore limit the reduction of the wind turbine power train efficiency that would normally be associated with adding an additional parallel power converter.

To achieve the reduction of the energy buffer losses a coordinated control system 20, 40 is required between the wind turbine power converter 10 and the energy buffer that allows the wind turbine to respond to the continual small variations of the power system frequency and less severe low voltage fault events, but then 'hand over' the response to larger events to the energy buffer.

Embodiments of this invention will provide benefits it will minimize the losses in the wind turbine power train, that result from introducing the parallel energy buffer, and therefore the power transfer efficiency of the wind turbine will not be significantly impacted.

An alternative solution would be to use a converter arrangement where the additional energy storage is added by increasing the capacitance of the main wind turbine converter DC link 4 and increasing the current/power rating of the network bridge. This would mean that the wind turbine generator network side converter 5 would have sufficient capability (current capacity and stored energy) to provide the required power/energy response to large power system frequency variations without the assistance of a parallel connected energy buffer. Therefore, the increased switching losses associated with the additional parallel energy buffer would not be present (assuming the increased current rating of the network bridge does not increase its switching losses).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for supplying electric power to a grid and for supporting the grid, the system comprising
  a power generator having a main converter coupled to the grid,
  an energy buffer having an energy storage and a secondary converter coupled to the grid in parallel with the main converter,
  a grid stability monitor configured to provide a grid stability indication representative of a stability level of the grid, and
  a controller configured to control the main converter and the secondary converter in dependency on the grid stability indication such that
  when the stability level is at least equal to a predetermined threshold value, the main converter is controlled to operate as a virtual synchronous machine and the secondary converter is controlled to operate to maintain a predetermined amount of energy in the energy storage, and
  when the stability level is below the predetermined threshold value, the secondary converter is operated to provide a predetermined response in order to support the grid stability.

2. The system according to claim 1, wherein the controller is configured to operate the secondary converter to maintain the predetermined amount of energy in the energy storage by operating the secondary converter to supply energy to the energy storage when the amount of energy in the energy storage drops below a predetermined minimum energy level and until the amount of energy in the energy storage reaches a predetermined maximum energy level.

3. The system according to claim 1, wherein the energy storage comprises a capacitor.

4. The system according to claim 1, wherein the energy storage comprises a bank of supercapacitors.

5. The system according to claim 1, wherein the grid stability monitor is configured to monitor one or more of:
  a deviation of the grid frequency from a nominal grid frequency, a grid frequency gradient,
a deviation of the grid voltage from a nominal grid voltage,
a grid voltage gradient,
a DC link voltage, and
a main converter current.

6. The system according to claim 5, wherein the predetermined threshold value comprises one or more of:
a predetermined deviation of the grid frequency from the nominal grid frequency,
a predetermined grid frequency gradient,
a predetermined deviation of the grid voltage from the nominal grid voltage,
a predetermined grid voltage gradient,
a predetermined DC link voltage value, and
a predetermined main converter current value.

7. The system according to claim 1, wherein when the level of stability is below the predetermined threshold value, the main converter is controlled to supply electric power to the grid without supporting the grid stability.

8. The system according to claim 1, wherein the power generator comprises a wind turbine generator and wherein the main converter comprises a rectifier, a DC link and an inverter.

9. The system according to claim 1, wherein the secondary converter comprises an inverter with semiconductor switches.

10. The system according to claim 1, wherein the controller comprises a main controller for controlling the main converter and a secondary controller for controlling the secondary converter.

11. A wind farm comprising a plurality of systems according to claim 1, wherein the power generator of each system is a wind turbine generator.

12. The wind farm according to claim 11, wherein the energy buffers of all systems are formed as a single integrated wind farm energy buffer.

13. A method of supplying electric power to a grid and for supporting the grid, the method comprising
providing a power generator comprising a main converter coupled to the grid,
providing an energy buffer comprising an energy storage and a secondary converter coupled to the grid in parallel with the main converter,
operating a grid stability monitor to provide a grid stability indication representative of a stability level of the grid, and
operating a controller to control the main converter and the secondary converter in dependency on the grid stability indication such that
when the stability level is at least equal to a predetermined threshold value, the main converter is controlled to operate as a virtual synchronous machine and the secondary converter is controlled to operate to maintain a predetermined amount of energy in the energy storage, and
when the stability level is below the predetermined threshold value, the secondary converter is operated to provide a predetermined response in order to support the grid stability.

\* \* \* \* \*